L. T. & R. C. LILLEY.
PEANUT HULLER.
APPLICATION FILED JULY 10, 1913.
1,151,486.
Patented Aug. 24, 1915.
2 SHEETS—SHEET 1.
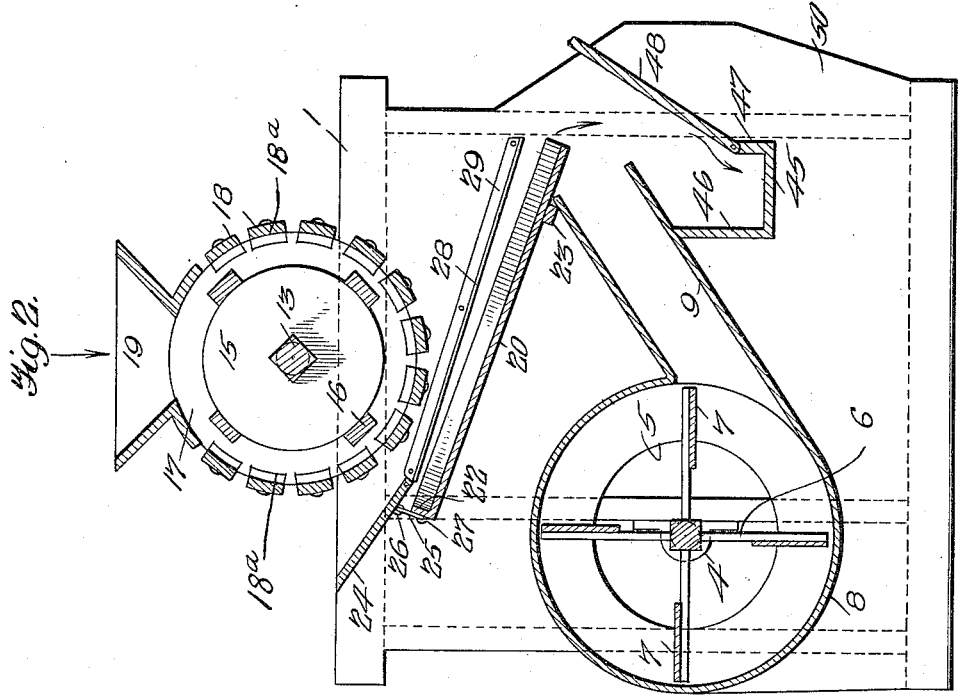
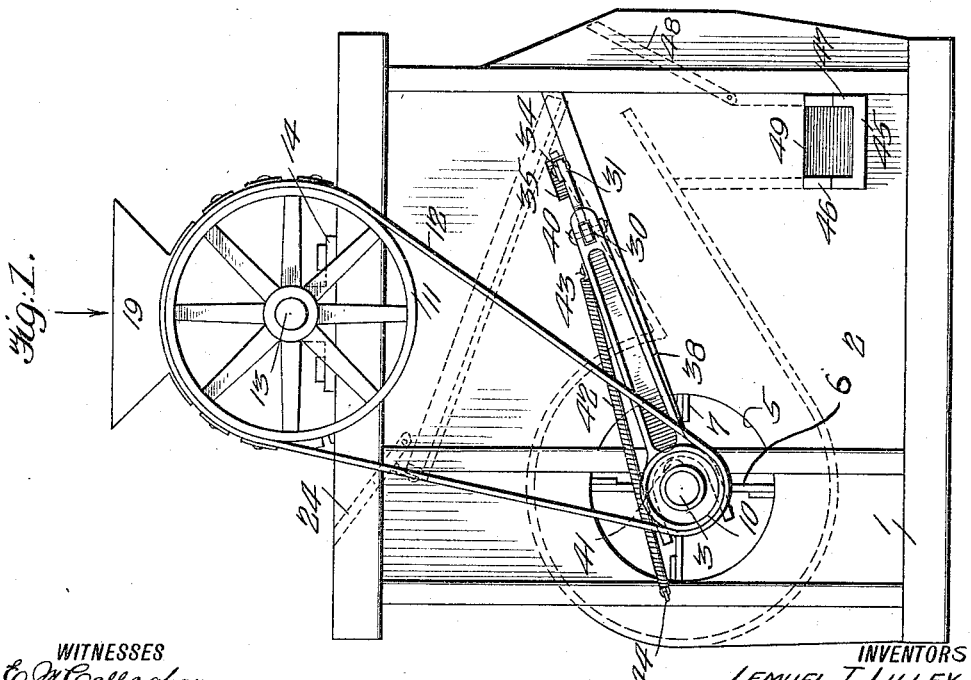
WITNESSES
E. W. Callaghan
C. E. Spanior
INVENTORS
LEMUEL T. LILLEY,
RUFUS C. LILLEY,
BY
Munn & Co.
ATTORNEYS

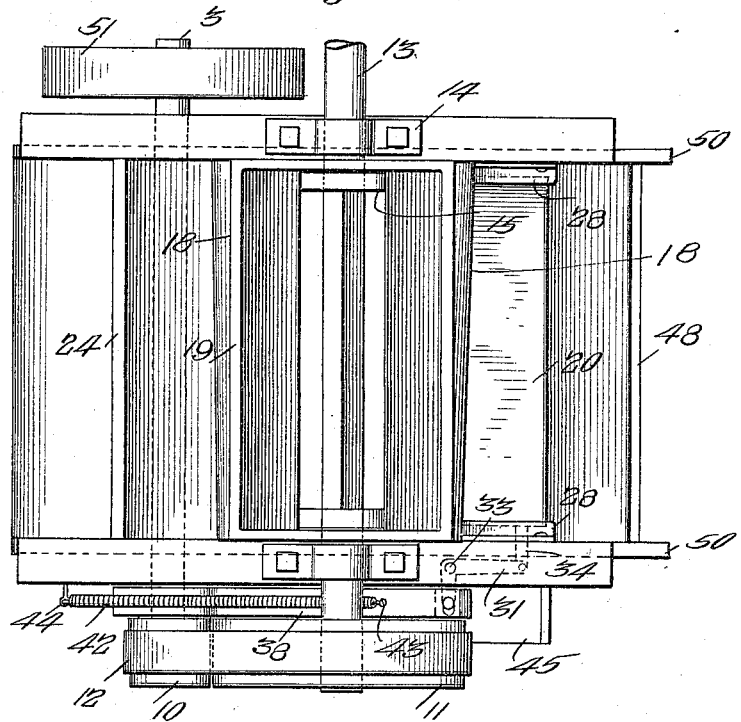
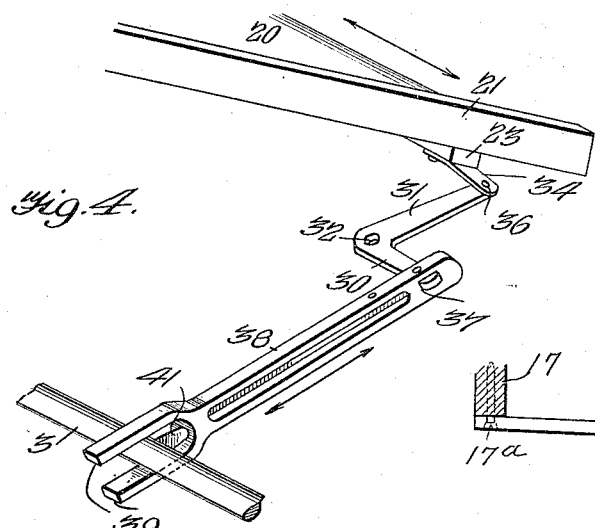

UNITED STATES PATENT OFFICE.

LEMUEL T. LILLEY AND RUFUS C. LILLEY, OF GATESVILLE, NORTH CAROLINA.

PEANUT-HULLER.

1,151,486.

Specification of Letters Patent.  Patented Aug. 24, 1915.

Application filed July 10, 1913.  Serial No. 778,363.

*To all whom it may concern:*

Be it known that we, LEMUEL T. LILLEY and RUFUS C. LILLEY, citizens of the United States, and residents of Gatesville, in the county of Gates and State of North Carolina, have made certain new and useful Improvements in Peanut-Hullers, of which the following is a specification.

Our invention is an improvement in peanut hullers, and has for its object to provide a machine of the character specified, by means of which the nuts may be hulled and cleaned and delivered from the machine in a marketable condition.

In the drawings: Figure 1 is a side view of the improved peanut huller, Fig. 2 is a transverse vertical section, Fig. 3 is a top plan view, Fig. 4 is a detail perspective view of the operating mechanism for the vibrating plate, and Fig. 5 is a longitudinal section through the concave showing the manner of connecting the bars 18.

The present embodiment of the invention comprises a frame 1 of substantially rectangular cross section, closed in by a casing 2, and a fan shaft 3 is journaled in bearings 4 on vertical members of the frame, the said shaft 3 being transverse to the frame. The casing 2 is provided with a circular opening 5, at each end of the fan shaft, and the said shaft is provided with a series of radial arms 6 near each end, the registering arms being connected by blades or vanes 7.

A cylindrical casing 8 encircles the fan shaft, and is co-axial with the said shaft, and the casing is provided with a tangential outlet 9. A pulley 10 is secured to the shaft 3 outside the casing, and the pulley is connected to another pulley 11, by means of a belt 12, and the pulley 11 is secured to one end of the shaft 13, journaled in sectional bearings 14 on the upper members of the frame 1. A circular plate 15 is arranged on each end of the shaft 13, the said shaft being square in cross section intermediate its ends, and the plates 15 have a similarly shaped opening to receive the shaft.

The plates 15 are connected by bars 16, the said bars being arranged longitudinally of the shaft, and parallel with the respective faces thereof. Four bars are provided, and the said bars are spaced at angular distances of 90° with respect to each other. A cylindrical casing incloses the shaft 13, the said casing being formed by circular end plates 17, which are connected by bars 18 extending longitudinally of the shaft 13. The bars 18 are spaced apart from each other, as shown, and are secured to the respective end plates 17.

At the top of the cylindrical casing, a hopper 19 is provided, the said hopper delivering into the cylindrical casing. The peanuts to be hulled are fed from the hopper 19, and as they leave the cylindrical casing, they drop upon the upper face of a plate 20 arranged transversely of the frame, and inclining downwardly toward its lower end. The plate is provided with flanges 21 at its ends, and with a flange 22 at its upper side edge, the said flanges extending upwardly, to prevent the peanuts from passing off at the ends and the upper side.

A strap 23 is arranged transversely of the under face of the plate near its lower edge, and the said strap bears against the upper side of the outlet chute 9 of the fan casing. The plate 20 rests upon the free edge of the said upper side, to support the lower edge, and the upper edge of the plate is supported from a cross plate 24, by means of links 25. Each link is connected at one end to an eye 26 on the under face of the cross plate, and at the other end to an eye 27 on the flange 22 of the plate.

The cross plate 24 extends transversely of the frame of the machine, and inclines downwardly toward its lower end. At each side of the plate 20 and above the same deflecting plates 28 are arranged, each of the said plates having a lateral flange 29 at its outer side edge which is secured to the inner face of the frame, and the free edge of each of the plates extends above the adjacent flange 21 of the said plate 20. The plate 20 is mounted for lateral vibration, and the plate is vibrated by means of an elbow lever consisting of arms 30 and 31. The elbow lever is provided at the junction of the arms with an opening 32, and a bolt 33 is passed through the opening to pivotally connect the elbow lever with the frame.

A bracket arm 34 is connected to the end of the strap 23 adjacent to the elbow lever, and the said arm extends through an opening 35 in the casing 2 and is pivoted to the free end of the arm 31 of the elbow lever, by means of a bolt or rivet 36. The arm 30 of the elbow lever passes through an opening 37 in one end of a slide bar 38 which is provided at the opposite end with a fork whose arms 39 extend on opposite sides of the outer end of the fan shaft 3.

A bolt 40 pivotally connects the arm 30 to the slide bar, and the shaft 3 is provided with a radial lug 41 between the arms 39 of the fork. A coil spring 42 is connected at one end to the slide bar, as indicated at 43, and at the other end to the frame 1 of the machine, as indicated at 44, and the said spring acts normally to draw the slide bar toward the shaft 3. The outlet of the fan casing delivers just below the lower end of the plate 20, and the peanuts as they pass over the lower edge of the said plate are subjected to the full force of the blast from the fan. The nuts fall into a delivery chute comprising a bottom 45 and inner and outer side walls 46 and 47 respectively.

A wall 46 is connected at its upper end to the under face of the outlet chute 9 of the fan, and a swinging plate 48 is hinged to the upper edge of the wall 47. The delivery chute 45—46—47 extends from one side of the machine to the other, and the said chute is inclined downwardly, toward that side of the machine adjacent to the slide bar 38. The said lower end passes through an opening 49 in the casing 2, to deliver the peanuts from the machine.

The hinge plate 48 inclines outwardly toward its upper end, and extension plates 50 are secured to the frame at the sides thereof, and at the ends of the plate 48. The extensions 50 support the plate 48 in inclined position, and the upper edge thereof extends above the upper face of the plate 20 at the lower edge thereof. The plate 48 is supported in inclined position in any suitable manner, and deflects the nuts as they fall from the plate 20 into the delivery chute.

In operation, the nuts to be hulled are fed to the machine through the hopper 19. The shaft 3 is provided at the opposite end from the pulley 10 with a pulley 51, which may be engaged by a belt from any suitable source of power to operate the machine. The cylinder, comprising the shaft 13, the end plates 15 and the bar 16, coöperates with the concave, comprising the cylindrical casing, consisting of the end plates 17 and the bars 18, to hull the nuts, and the hulled nuts pass downwardly between the bars 18 on to the plate 20. This plate is vibrated rapidly from side to side by means of the slide bar 38 and the lug on the shaft 3, to feed the nuts downwardly over the lower edge thereof. As the nuts pass over the lower edge of the said plate, they receive the full force of the air blast from the fan, and the hulls, trash and the like are driven out of the machine from the upper edge of the extension plate 48. The hulled nuts pass downwardly into the delivery chute and are delivered from the machine. The machine is simple, easily operated, and since it has but few parts, it is not liable to get out of repair.

It will be noted from an inspection of Fig. 5, that the concave is of greater diameter at one end than at the other. The disks or end plates 17 of the concave are of equal diameter, but at the end remote from the pulley 11, blocks 18$^a$ are arranged between the ends of the bars 18 and the edge of the concave. This arrangement appears in Fig. 3, where it will be seen that the bars 18 at the end adjacent to the pulley 51 are farther from the center of the concave than at the end adjacent to the pulley 11. By inserting blocks 18$^a$ of various sizes, the bars may be moved near to or farther away from the center as may be desired. The bars may be held by nails or screws 17$^a$.

It has been found in practice that the best results have been attained where the space between the bars of the concave is just a little larger than the diameter of the peanuts to be hulled. This space should be just large enough to permit the nuts to pass freely. If the space is too small the nuts cannot escape and will be broken while if it is too large the nuts will not be acted upon and will pass out with the waste. The peanuts grown in any section of country vary greatly in size, in accordance with the weather conditions. The farmers, as a rule, plant more than one variety, because of the fact that all varieties of seed do not mature to the best advantage under the same conditions, and since conditions as to moisture and temperature cannot be known before hand, the several varieties are planted in order that one variety may meet the conditions best suited to properly mature the same, hence the peanuts of each season vary greatly in size. It has been found in practice that the width of the space between the bars of the concave must approximate closely the diameter of the peanuts to be hulled. For this reason a degree of adjustment is essential.

We claim:

1. In a peanut huller, a cylinder comprising end plates of circular form, bars connecting the plates and arranged in spaced relation, a concave inclosing the cylinder and comprising circular end plates of greater diameter than the plates of the cylinder, longitudinal bars connecting the end plates and spaced apart from each other, said plates being omitted on the upper side of the concave, and a feed hopper connected with the concave at the said upper side, the end plates of the concave being of equal size, and interchangeable blocks arranged between the bars and the end plate at one end of the concave.

2. In a peanut huller, a concave comprising end plates of approximately circular form, bars connecting the plates and arranged in spaced relation, the bars being omitted at the upper side of the concave to permit the material to be fed to the concave, and means in connection with one of the plates and the adjacent ends of the bars for spacing the said ends of the bars nearer to or farther away from the center of the said plate, said means comprising interchangeable blocks arranged between the said ends of the bars and the plates.

3. In a peanut huller, a concave comprising end plates of approximately circular form, bars connecting the plates and arranged in spaced relation, the bars being omitted at the upper side of the concave to permit the material to be fed to the concave, and means in connection with one of the plates and the adjacent ends of the bars for spacing the said ends of the bars nearer to or farther away from the center of the said plate.

4. In a peanut huller, a concave comprising end plates, and bars connecting the plates and arranged in spaced relation, and means in connection with one of the plates and the adjacent ends of the bars for spacing the said ends of the bars near to or farther from said plate.

LEMUEL T. LILLEY.
RUFUS C. LILLEY.

Witnesses:
CHAS. P. TURNER,
EDWARD O. CORBITT.

Copies of this patent may be obtained for five cents each, by addressing the "Commissioner of Patents, Washington, D. C."